United States Patent [19]
Tsai et al.

[11] Patent Number: 5,471,376
[45] Date of Patent: Nov. 28, 1995

[54] LOW-LOSS ACTIVE VOLTAGE-CLAMP CIRCUIT FOR SINGLE-ENDED FORWARD PWM CONVERTER

[75] Inventors: Fu-Sheng Tsai, Northboro; William W. Ng, Leominster, both of Mass.

[73] Assignee: Digital Equipment Corporation, Maynard, Mass.

[21] Appl. No.: 27,217

[22] Filed: Mar. 5, 1993

[51] Int. Cl.$^6$ ................................................. H02M 3/335
[52] U.S. Cl. ...................................................... 363/20; 363/21
[58] Field of Search ............................... 363/20, 21, 97, 363/131

[56] References Cited

U.S. PATENT DOCUMENTS

| | | | |
|---|---|---|---|
| 4,316,242 | 2/1982 | Colangelo et al. | 363/21 |
| 4,772,995 | 9/1988 | Gautherin et al. | 363/21 |
| 4,791,546 | 12/1988 | Carroll | 363/21 |
| 5,206,800 | 4/1993 | Smith | 363/21 |

OTHER PUBLICATIONS

Murakami et al., "Analysis of a Resonant Reset Condition for a Single-Ended Forward Converter," *IEEE*, NTT A. E. Labs., CH2523, 1018–1023, Sep. 1988.

*Primary Examiner*—Thomas M. Dougherty
*Assistant Examiner*—Matthew V. Nguyen
*Attorney, Agent, or Firm*—Gary Ross; Denis G. Maloney; Arthur W. Fisher

[57] ABSTRACT

Transformers (T1, T2), switches (M1) and (M2), rectifiers (DR1, DR2, DR3, DR4) and low-pass filter (LF, CF) form a basic power train circuit (12). Auxiliary switches (A1, A2), diodes (DS1, DS2) and capacitors (CS1, CS2) form active clamp circuit (10). The capacitances for (CS1, CS2) are chosen large enough such that the voltages (vCS1, vCS2) across the capacitors are essentially constant during several switching cycles. Switches (M1) and (A1) are driven by the signal ($V_{G1}$), while switches (M2) and (A2) are driven by ($V_{G2}$). When (M1) is turned OFF, the energies stored in the magnetizing and leakage inductances in (T1) will resonate with the output capacitance of (M1) first. When the voltage ($V_{M1}$) across (M1) exceeds the voltage ($V_{CS1}$) across (CS1), (DS1) conducts and ($V_{M1}$) is clamped at ($V_{CS1}$), which has a steady-state value of slightly less than two times the input voltage (E). During this interval, the capacitor (CS1) is charged by the leakage inductor current ($i_{LK1}$). When ($i_{LK1}$) reduces to zero, (DS1) stops conducting, and ($V_{M1}$) decreases to the level of (E). When (M2) is triggered, (A1) is also triggered. Diodes (DS1) and (DS2) are both reverse-biased. The energy in capacitor (CS1) is discharged through (A2) back to (E). Meanwhile, transformer (T1) is being reset. When (M2) is turned OFF, (A2) is also turned OFF. Voltage ($V_{M1}$) decreases to (E), and a similar process occurs for the following half switching cycle, with the roles of (M1, A1, DS1, CS1, T1) and (M2, A2, DS2, CS2, T2) interchanged, respectively.

17 Claims, 10 Drawing Sheets

LOW-LOSS ACTIVE VOLTAGE-CLAMP CIRCUIT FOR SINGLE-ENDED FORWARD PWM CONVERTER

BACKGROUND OF THE INVENTION

1. Field of the Invention

The present invention relates generally to DC to DC converters and specifically to a circuit to recover energies in snubbing capacitors by using auxiliary switch(es) in a single-ended forward converter. More particularly, it relates to such a circuit in single-ended interleaved or non-interleaved forward converters. Most especially, it relates to such a circuit which clamps the peak primary switch voltages to below a predetermined voltage, independent of output power, and properly resets the power transformers, introducing virtually no losses.

2. Description of the Prior Art

The demand for distributed power systems in computer and communications industries has mandated the power conversion from a low dc bus voltage, typically 48 volts, to voltage levels suitable for integrated circuits, such as 5.1 volts and 3.3 volts. In the design of such DC-DC converters, one of the safety requirements for meeting CLASS 3 per IEC Publication 950 is that the peak primary voltage cannot exceed 140 volts between any two points under any operating condition.

A single-ended forward-type pulse width modulated (PWM) converter is a prime candidate for this application. At higher power levels, interleaved type forward converters are used. The converter usually operates with an input voltage range of 40–60 volts for accommodating a possible battery back up. To prevent the peak primary voltage from exceeding 140 volts, a large snubbing capacitance has to be used across the main switch. The energy in the snubbing capacitance is lost when the main switch turns on, and thus the converter's efficiency suffers. As the output power increases, the situation becomes more severe because the energy in the leakage inductance increases and as a result the snubbing capacitance has to be larger, resulting in greater loss of efficiency as the larger snubbing capacitance is discharged through the primary switch.

A distributed power system usually consists of a front-end power stage, which converts typical ac outlet voltage to a safe low dc voltage and performs power factor correction to the ac line. The low dc voltage is then distributed to the loads, where small local converters are used to convert the low dc voltage to proper levels, for example for use with integrated circuits. Such an architecture reduces the hazards of high voltage distribution, provides built-in redundancy over systems in which voltages are centrally generated and distributed, and has better dynamic responses to the loads. The most popular dc voltage selected for low dc voltage distribution systems is 48 volts. Many converter modules converting 48 volts to proper voltage levels for integrated circuits have recently been developed and are commercially available. Various converter topologies have been adopted in the converter modules. The single-ended forward topology with resonant reset, as shown in FIG. 1, is among the most popular. For higher power levels, interleaved single-ended forward converters, as shown in FIG. 2, are used. FIGS. 1A and 2A illustrate some of the waveforms present in the circuits of FIGS. 1 and 2, respectively.

When the main switch of a single-ended forward converter turns off, energies stored in the magnetizing and leakage inductances tend to resonate between the inductances and the output capacitance of the main switch, such as a MOSFET, and generate voltage spikes and high-frequency ringing. Note that a MOSFET effectively has a capacitor $C_M$ between its drain and source terminals, and a diode $D_M$ from its source to drain terminal as illustrated by dotted lines in conjunction with a MOSFET in the insert in FIG. 1. These elements are not explicitly illustrated in the circuit schematics, but are understood to be present by those skilled in the art.

Traditionally, resistance-capacitance (R-C) or resistance-diode-capacitance (R-D-C) snubber circuits are used to provide a low impedance path to limit the spikes caused by high change of current with respect to time (di/dt), and/or to damp the ringing. An R-C snubber circuit is a resistor connected to the MOSFET main switch drain in series with a capacitor connected to the source. An R-D-C snubber circuit has the structure of the R-C snubber circuit but with an additional diode in parallel with the resistor and with its anode connected to the drain and the cathode connected to the capacitor. These types of snubber circuits, however, are very lossy and inefficient.

Another traditional approach is to add only external capacitance across the main switch to decrease the characteristic impedance and the resonant frequency. This results in a reduction of the spikes and the ringing by significantly reducing the resonant frequency. However, the introduction of the additional capacitance disadvantageously increases the turn-on energy losses of the main switches (the capacitor energies are dissipated when the main switch turns on), and the converter's efficiency suffers. To meet CLASS 3 per IEC Publication 950 safety requirements, large capacitances are needed to prevent the peak main switch voltage(s) from exceeding 140 V under all operating conditions. The requirement for large capacitances, typically about 20 to 50 times the output capacitance of the MOSFET, serving as the main switch, depending on the energy of the transformer leakage induction, makes this approach unattractive. Although the spikes and ringing can also be reduced by increasing the magnetizing inductance, there is also a practical limitation, as well as cost concerns, to making large magnetizing inductances.

Another approach, the zero-voltage switched-snubber concept, may effectively clamp the voltage across the main switch or the output rectifier diodes in PWM converters to a specified level while recovering the energies in the snubbing capacitor. The zero-voltage switching concept requires that the switching of the main switch occur when the voltage of the snubbing capacitor is zero or a very low voltage. As the voltage across the main switch at the time of its switching on increases, the required snubbing capacitance increases as the square of the voltage. A larger snubbing capacitance means greater energy loss when switching. The zero-voltage switched snubber concept allows the use of lower voltage rated switching devices as the main switch, thus reducing the devices' conduction losses and improving the overall efficiency of the converter. However, although zero-voltage-switching can be achieved using switched snubbers, such implementation requires additional gate-drive logic and extra drivers for the auxiliary switch or switches. This additional gate-drive logic and driver(s) is not commercially available as a single integrated device, and thus must be made specifically for this purpose, resulting generally in greater size and cost. Furthermore, the transformers having specially designed characteristics may be needed to operate in conjunction with these additional components.

The typical circuit operation of a single-ended forward converter as in FIG. 1 is now described. When MOSFET main switch M1 turns on, capacitor CS1 is totally discharged ($V_{CS1}=0$), diode DR1 is conducting, and diode DR2 is off. The majority of the input voltage, E, given by the expression $$\frac{LM1}{(LK1+LM1)} \times E \approx E; \text{ (for } LM1 >> LK1\text{)} \tag{1}$$

where:

LM1=transformer magnitizing inductance,

LK1=transformer leakage inductance,

E=voltage provided by voltage source E, is transformed to the transformer secondary, and the voltage across diode DR2 is given by, $$V_{DR2} \approx E/N \tag{2}$$

where:

N=the primary to secondary transformer turns ratio

E=voltage provided by voltage source E, $V_{DR2}$=voltage across diode DR2 and the load current is reflected back to the transformer primary. Therefore, the reflected load current in the primary, $i_p$, is related to the load current, $I_0$, by the expression, $$i_p \approx I_0/N \tag{3}$$

where:

$i_p$=reflected load current in the transformer primary winding, $I_0$=load current in RL, and N=the primary to secondary transformer turns ratio.

When main switch M1 is turned off, the current in leakage inductor LK1, designated $i_{LK1}$ (which includes the magnetizing current $i_{LM1}$, and the reflected load current, $i_p$) is diverted to capacitor CS1. The voltage $V_{CS1}$ across capacitor CS1 rises, and the voltage transformed to the secondary decreases. When $V_{CS1}$ exceeds the magnitude of E, negative current flows in the primary inducing voltage in the secondary such that diode DR2 is turned on and diode DR1 starts to be commutated. During the commutation interval, transformer T1 secondary winding is effectively shorted because both diode DR1 and DR2 are conducting (for a very brief time) and inductor current $i_{LK1}$ resonates with capacitor voltage $V_{CS1}$.

When diode DR1 turns off, output current freewheels through diode DR2 and the capacitor voltage $V_{CS1}$ begins to resonate with $i_{LM1}$. (At this instant, the magnitizing current $i_{LM1}$ is usually negative. In this event, capacitor voltage $V_{CS1}$ decreases.) When $V_{CS1}$ decreases below E, positive current flows in the primary, inducing a voltage in the secondary and causing diode DR1 to conduct and commutate diode DR2. However, when diode DR1 starts conducting, reflected current $i_p$ forces $V_{CS1}$ to increase and try to commutate diode DR1. If diode DR1 is commutated, the negative magnetizing current $i_{LM1}$ forces $V_{CS1}$ to decrease again. This mechanism forces $V_{CS1}$ to resonate with $i_{LK1}$ around the input voltage level until MOSFET main switch M1 is turned on (triggered) by signal $V_{G1}$ applied to its gate. At that instant, $V_{CS1}$ decreases to zero and the energy in capacitor CS1 is dissipated through MOSFET main switch M1. Diode DR1 is forced to conduct and diode DR2 is commutated. Load current $I_0$ is again reflected to the primary side of transformer T1 until MOSFET main switch M1 is turned off by trigger signal $V_{G1}$, which starts another cycle of the operation.

SUMMARY OF THE INVENTION

These and related problems may be solved and features may be obtained through use of the novel low-loss active voltage-clamp circuit for single-ended forward Pulse Width Modulator converter herein disclosed. Active voltage clamped interleaved and non-interleaved single-ended forward converter circuits, each for converting an input dc voltage provided by a voltage source to an output voltage signal and delivering the output voltage signal to an electrical load, are disclosed. The circuit provides protection against high voltage hazards by clamping the voltage across a main switch, that cooperates in generating the output voltage, to a predetermined peak value.

The non-interleaved clamp circuit has circuit means for generating main and auxiliary switch gating control signals, a transformer for inducing a secondary current signal in a secondary conductor in response to a first current signal in a primary conductor using magnetic coupling between the conductors, a main switch for switching main current on and off in response to the main switch gating control signals connected in series between the transformer and the voltage source, and an active voltage clamp means for clamping the voltage across the main switch to a predetermined peak value in response to said auxiliary switch gating control signals. It may optionally include a rectifier circuit, and a low-pass L-C filter circuit for additional processing of the output voltage signal.

The interleaved single-ended forward converter circuit permits high power outputs and is more complex. It has circuit means for generating main and auxiliary switch gating control signals, two transformers for inducing secondary current signals each of two secondary conductors in response to a first current signal in a primary conductor using magnetic coupling between the conductors, two main switches for switching main current on and off in response to the main switch gating control signals connected in series between the transformer and the voltage source, and two active voltage clamp means for clamping the voltage across the main switch to a predetermined peak value in response to the auxiliary switch gating control signals. It may optionally include rectifier circuits, and a low-pass L-C filter circuit for additional processing of the output voltage signal.

The attainment of the foregoing and related advantages and features of the invention should be more readily apparent to those skilled in the art, after review of the following more detailed description of the invention, taken together with the drawings, in which:

DETAILED DESCRIPTION OF THE INVENTION

Figure 1:
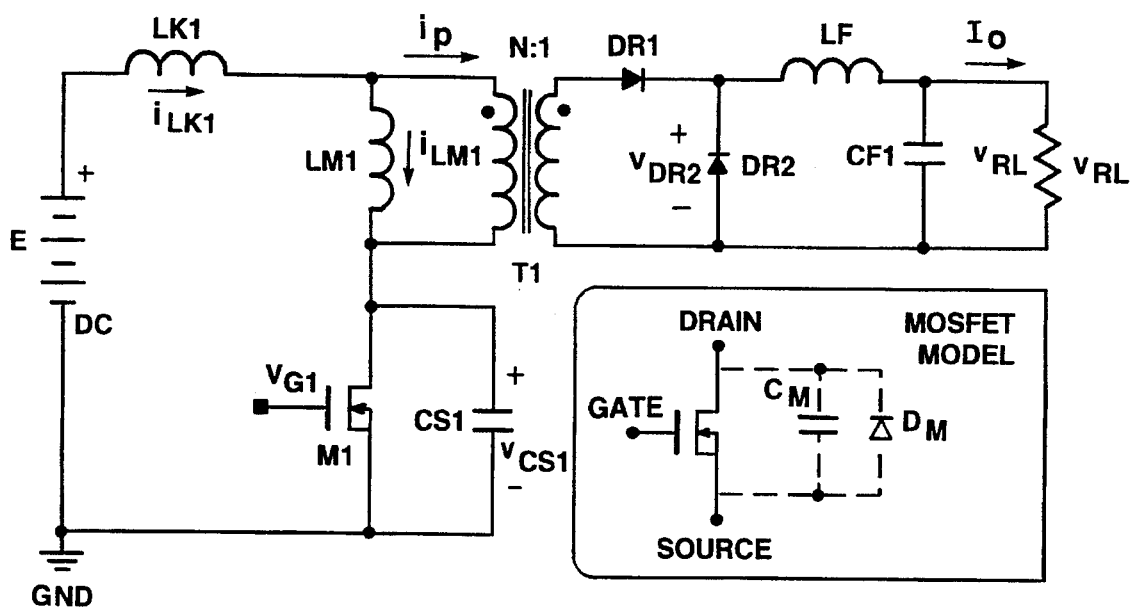
FIG. 1 is a schematic diagram of a prior art single-ended forward converter with resonant reset, useful for understanding the invention.
Figure 1A:
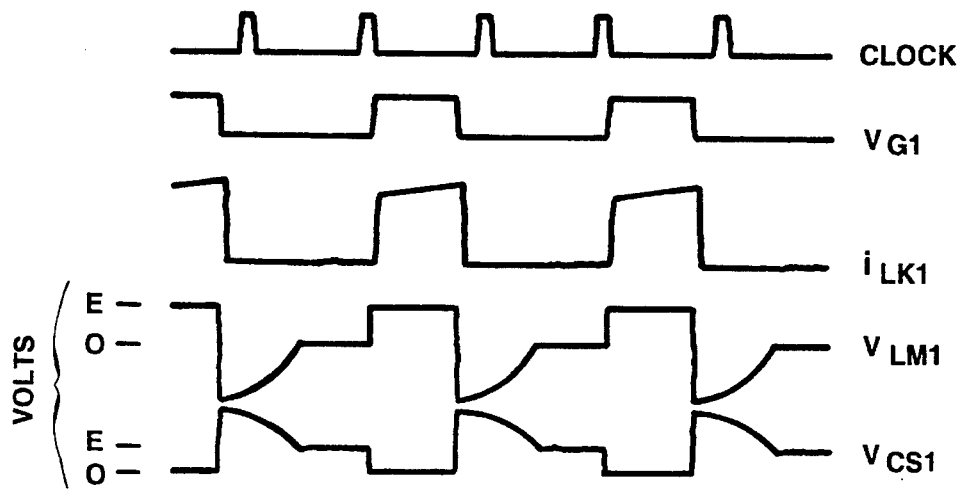
FIG. 1A is a waveform diagram for the circuit of FIG. 1.
Figures 2, 2A:
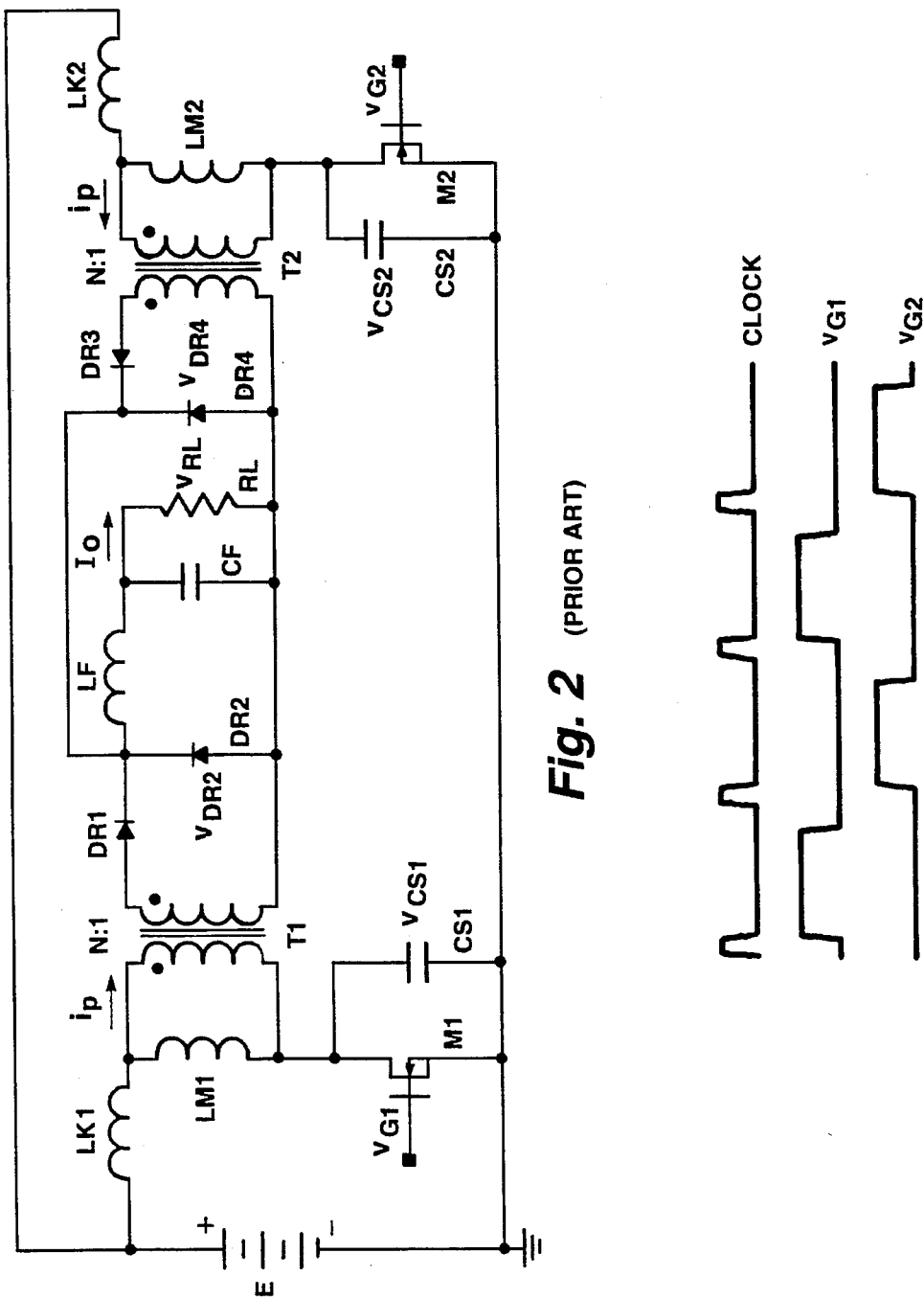
FIG. 2 is a schematic diagram of a prior art interleaved single-ended forward converter with resonant reset, useful for understanding the invention.
FIG. 2A is a waveform diagram for the circuit of FIG. 2.
Figure 3:
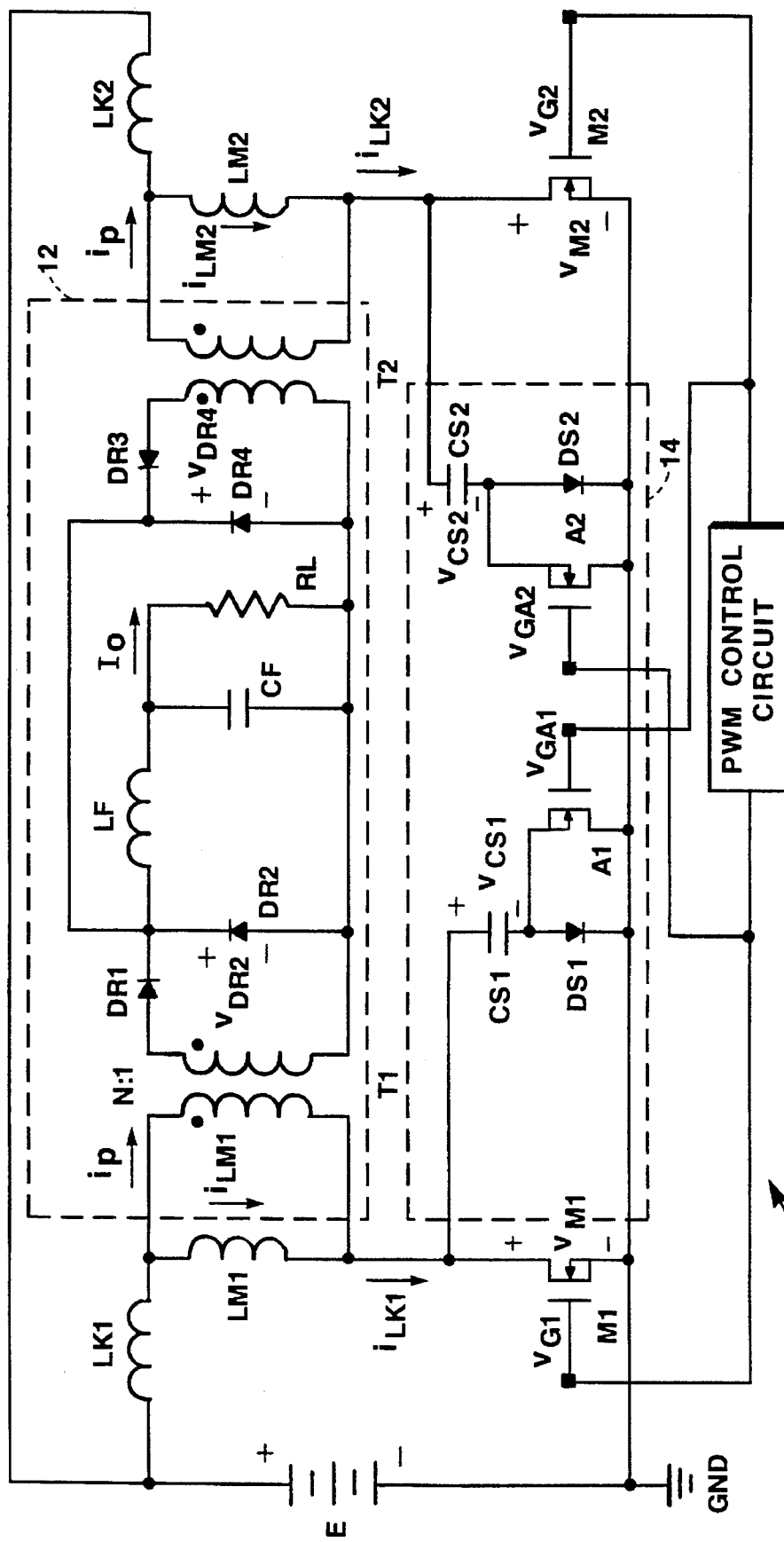
FIG. 3 is a schematic diagram of an embodiment of a low loss active voltage-clamp circuit for a single-ended, interleaved forward converter in accordance with the invention.
Figure 3A:
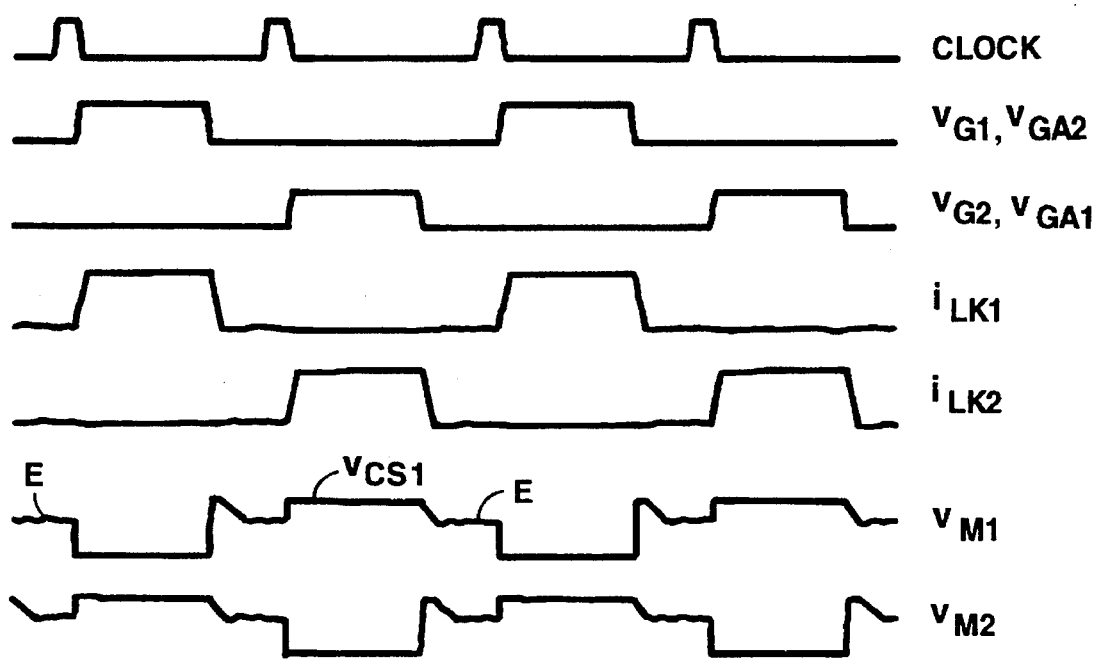
FIG. 3A is a waveform diagram for the circuit of FIG. 3 under a first set of operating conditions.
Figure 3B:
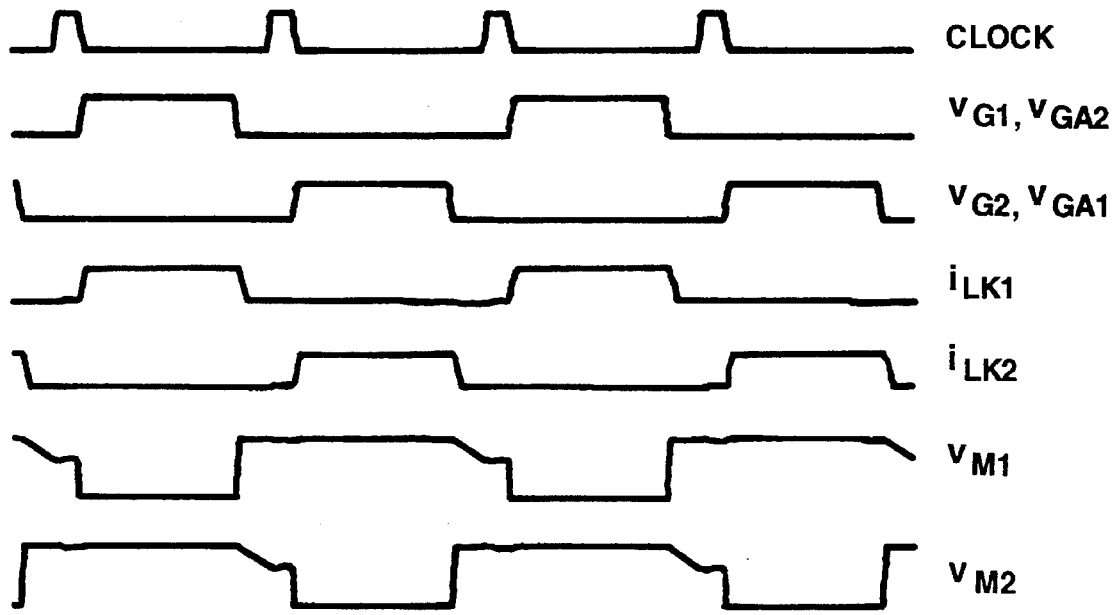
FIG. 3B is a waveform diagram for the circuit of FIG. 3 under a second set of operating conditions.

Turning now to the drawings, more particularly to the schematic drawings of FIG. 3 and the associated timing diagrams of FIGS. 3A and 3B, there is shown a general form of a power converter 10 including a low loss active voltage clamp circuit 14 that illustrates the invention in conceptual form. Transformers T1 and T2, switches M1 and M2, rectifier diodes DR1, DR2, DR3, and DR4, and low-pass filter LF, CF form a basic power train circuit 12. Auxiliary switches A1 and A2, diodes DS1 and DS2 and capacitors CS1 and CS2 form the active clamp circuit 14. In the interleaved converter of FIG. 3, there are two substantially symmetric sides to the circuit. One side includes transformer T1, main switch M1, rectifier diodes DR1 and DR2, auxiliary switch A1, diode DS1, and capacitor CS1. The other side includes transformer T2, main switch M2, rectifier diodes DR3 and DR4, auxiliary switch A2, diode DS2, and capacitor CS2. Low-pass filter LF and CF is shared by both sides, and load RL is also common to each side. Each of the two sides operates in the same manner in response to alternate clock and control gating signals as illustrated in FIG. 3A and 3B.

The active voltage clamped interleaved single-ended forward converter circuit for converting an input dc voltage provided by a voltage source to an output voltage signal and delivering the output voltage to an electrical load comprises a means for generating main switch gating control signals and means for generating auxiliary switch gating control signals.

The interleaved single-ended forward converter circuit further includes first transformer means for inducing a first induced current signal in at least one other conductor in response to a first current signal in a first primary conductor using magnetic coupling between the first conductor and the at least one other conductor, the first transformer means coupled to the voltage source. The at least one other conductor may be a secondary transformer winding or a secondary and tertiary transformer winding. In the embodiment illustrated in FIG. 3 there is only a secondary conductor in the form of the transformer secondary winding.

The interleaved single-ended forward converter circuit further includes second transformer means for inducing a second induced current signal in at least one other conductor in response to a second current signal in a second primary conductor using magnetic coupling between the first conductor and the at least one other conductor, the second transformer means coupled to the voltage source.

The interleaved single-ended forward converter circuit further may optionally include first rectifier means for rectifying the induced first secondary signal and generating a first rectified signal; and second rectifier means for rectifying the induced second secondary signal and generating a second rectified signal. The interleaved single-ended forward converter circuit further includes means for combining the first and second rectified signals into a composite rectified signal when the rectifiers are present.

The interleaved single-ended forward converter circuit further may optionally include low-pass filter means for low-pass filtering the composite rectified signal to remove signal frequencies causing undesired amplitude variation of the rectified signal and for generating the output signal.

The interleaved single-ended forward converter circuit may further include first main current switch means for switching first main current on and off in response to first main switch gating control signals connected in series between the first transformer means and the voltage source.

The interleaved single-ended forward converter circuit further includes second main current switch means for switching second main current on and off in response to second main switch gating control signals connected in series between the second transformer means and the voltage source.

The interleaved single-ended forward converter circuit further includes first active voltage clamp means for clamping the voltage across the first main current switch means to a predetermined peak value in response to first auxiliary switch gating control signals. The circuit further includes second active voltage clamp means for clamping the voltage across the second main current switch means to a predetermined peak value in response to second auxiliary switch gating control signals.

Each the first and second active voltage clamp means may comprise an auxiliary switch means for switching, an auxiliary switching diode, and a clamping capacitor. In this embodiment, the clamping capacitor connected to the lowest potential terminal of the voltage source and to a terminal of the switching diode, the clamping capacitor having a capacitance sufficiently large so that the voltage across the clamping capacitor is maintained within the desired voltage range during switching cycles. The auxiliary switching diode connected between the clamping capacitor and the highest potential terminal of the main switch means, the auxiliary switching diode being reverse biased when the main current switch means is switched on. The auxiliary switch means for switching connected in parallel to the switching diode between the clamping capacitor and the highest potential terminal of the main switch means. The auxiliary switch means for switching being responsive to the auxiliary switch gating control signals.

The capacitance values of capacitors CS1 and CS2 are chosen large enough such that the voltages $V_{CS1}$, $V_{CS2}$ across capacitors CS1 and CS2, respectively, are essentially constant during several switching cycles. Capacitance values are typically about 100 to 200 times greater than the output capacitance of the MOSFETs M1 and M2 serving as the main switches, but without theoretical limit, depending upon the energy in the leakage inductance LK1 and LK2.

Gating signals $V_{G1}$ and $V_{G2}$ are generated from pulse width modulation (PWM) control circuits, such as a commercially available UC3825 control chip, obtainable from Unitrode, Merrimack, N.H. 03054-0399, with two alternate output signals made available to the control gates of switches M1 and A2, and M2 and A1, as voltages and $V_{GA1}$, and $V_{G2}$ and $V_{GA2}$, respectively.

When main switch M1 is turned OFF, the energies stored in magnetizing inductance LM1 and leakage inductances LK1 in transformer T1 will resonate with the output capacitance of main switch M1 (i.e. source-to-drain capacitance when main switch M1 is formed as a MOSFET). When voltage $V_{M1}$ across main switch M1 exceeds the voltage $V_{CS1}$ across capacitor CS1, diode DS1 conducts and $V_{M1}$ is clamped at $V_{CS1}$, which in one embodiment preferably has a steady-state value of slightly less than two times the input voltage E, depending on the duty cycle. During this interval, capacitor CS1 is charged by the leakage inductor current $i_{LK1}$. When current $i_{LK1}$ decreases to zero, diode DS1 stops conducting. With current no longer flowing through diode DS1, the output capacitance of switch M1 resonates with magnitizing inductance LM1 and $V_{M1}$ decreases to the level of E.

When main switch M2 is turned ON, switch A1 is also turned on. Diodes DS1 and DS2 are both reverse-biased at this time. The energy in capacitor CS1 is discharged through switch A1 and T1, until capacitor CS1 reaches voltage E and the voltage across main switch M1 increases to $V_{CS1}$. In different line and load conditions, $V_{M1}$ may barely change when switch A1 is turned on and its magnitude remains essentially the same as $V_{CS1}$, as illustrated in FIG. 3B. Meanwhile, transformer T1 is being reset by setting up a voltage across transformer T1 in the opposite direction.

When switch M2 is turned OFF, switch A1 is also turned OFF. Voltage $V_{M1}$ decreases to E, and a similar process occurs for the following half switching cycle, with the roles of M1, A1, DS1, CS1, T1 and M2, A2, DS2, CS2 and T2 interchanged, respectively.

Figure 4:
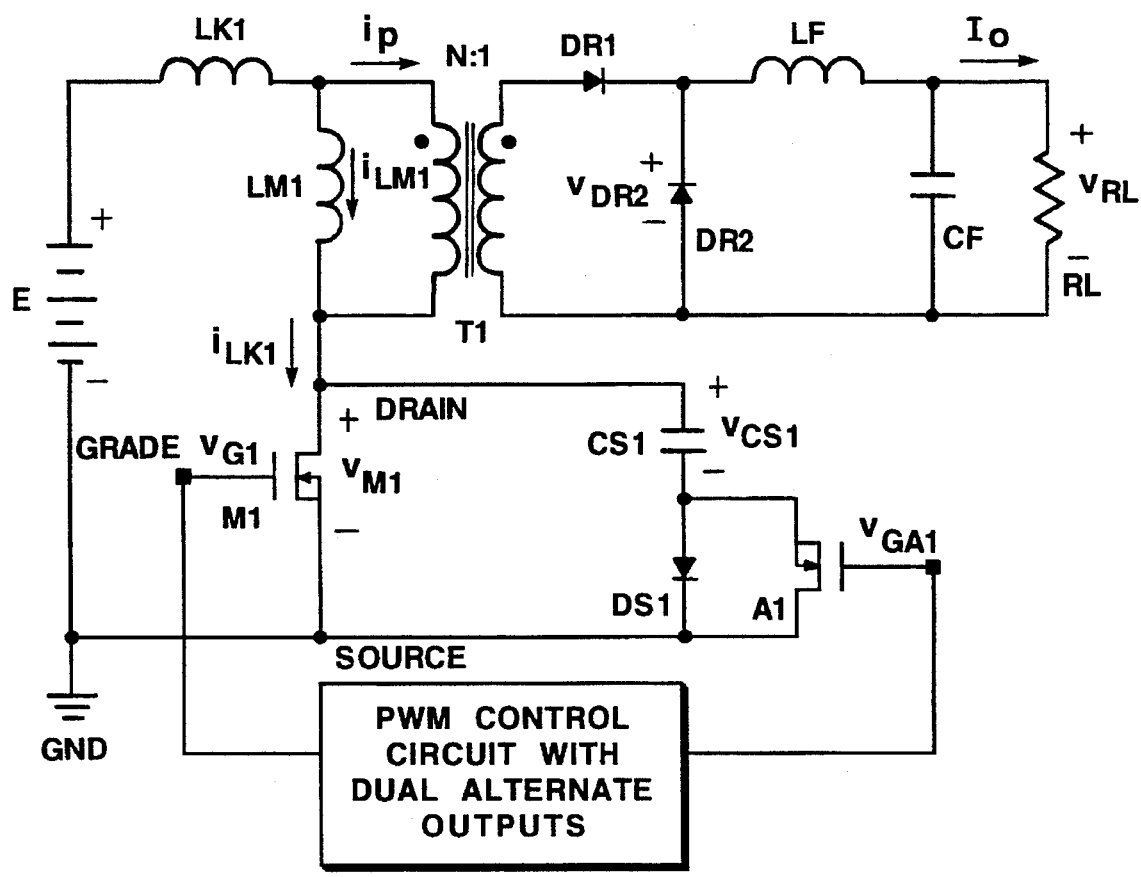
FIG. 4 is a schematic diagram of a simple embodiment of a non-interleaved active voltage clamp circuit for a single-ended forward converter in accordance with the present invention.
Figure 4A:
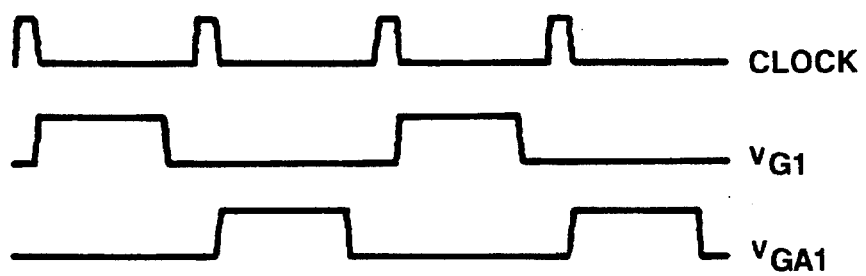
FIG. 4A is a waveform diagram for the circuit of FIG. 4.

The teachings of this invention are also used in a single-ended forward converter, one embodiment of which is illustrated in FIG. 4, which is now described also with reference to the timing diagram of FIG. 4A. In this case, $V_{G1}$ is used only to trigger M1, and $V_{G2}$ is used only to trigger switch A1. The interleaved single-ended converter is useful when higher power levels are needed.

An embodiment of the active voltage clamped non-interleaved single-ended forward converter circuit illustrated in FIG. 4, for converting an input dc voltage provided by a voltage source to an output voltage signal and delivering the output voltage to an electrical load comprises a means for generating main switch gating control signals and means for generating auxiliary switch gating control signals.

The means for generating main switch gating control signals and the means for generating auxiliary switch gating control signals may be a single PWM control circuit, such as a PWM control chip, although multiple control circuits may be used if they are synchronized.

This embodiment of the non-interleaved single-ended forward converter circuit also has transformer means for inducing a secondary current signal in a secondary conductor in response to a first current signal in a primary conductor using magnetic coupling between the conductors, the primary conductor of the transformer means is coupled to the voltage source. The transformer means may comprise a transformer having a primary winding, a secondary winding, a two terminal input port for receiving an input voltage defined by the primary winding, and a two terminal output port supplying an output voltage derived from the input voltage and defined by the secondary winding.

The non-interleaved single-ended forward converter circuit may optionally include rectifier means for rectifying the induced secondary signal and generating a rectified signal, and low-pass filter means for low-pass filtering the rectified signal to remove signal frequencies causing undesired amplitude variation of the rectified signal and for generating the output voltage signal. The rectifier means may comprises a first diode and a second diode, the first diode connected to a first output terminal of the secondary winding, the second diode connected between the first diode and a second output terminal of the secondary winding.

The low-pass filter means for filtering may comprise a filter inductor and a filter capacitor, the filter inductor connected between a common node of the first and second diode and the filter capacitor, the filter capacitor connected between the filter inductor and the second terminal of the secondary winding, the filter capacitor also connected in parallel to the electrical load.

This embodiment of the non-interleaved single-ended forward converter circuit also includes main current switch means, for switching main current on and off in response to the main switch gating control signals, connected in series between the transformer means and the voltage source. The means for switching main current is connected between a second transformer input terminal and a second voltage source terminal, and being responsive to the main switch gating control signal.

The non-interleaved single-ended forward converter circuit further includes active voltage clamp means for clamping the voltage across the main current switch means to a predetermined peak value in response to the auxiliary switch gating control signals. The active voltage clamp means may comprise an auxiliary switch means for switching, an auxiliary switching diode, and a clamping capacitor. In this embodiment, the clamping capacitor is connected to the second input terminal of the primary conductor and to a terminal of the switching diode, the clamping capacitor has a capacitance sufficiently large so that the voltage across the clamping capacitor is maintained within the desired voltage range during switching cycles. The auxiliary switching diode is connected between the clamping capacitor and the second voltage source terminal, and the auxiliary switching diode is reverse biased when the main current switch means is switched on. The auxiliary switch means for switching is connected in parallel to the switching diode between the clamping capacitor and the second voltage source terminal. The means for switching is responsive to the auxiliary switch gating control signal.

The embodiment described above and illustrated in FIG. 3 works well during normal operating conditions. However, in occasions where duty ratios for the consecutive switchings (clock cycles) become highly asymmetrical, such as under current limit conditions, one of the capacitor voltages ($V_{CS1}$ or $V_{CS2}$) will be extremely high (short reset period for the transformer) while the other capacitor voltage will be much lower (long reset period for the transformer). This high voltage may exceed maximum device ratings under some conditions and damage or destroy switches M1 and A1. One way to remedy this potential problem is to combine the two capacitors CS1, CS2 together into a single capacitor CS, as depicted in FIG. 4.

Figure 5:
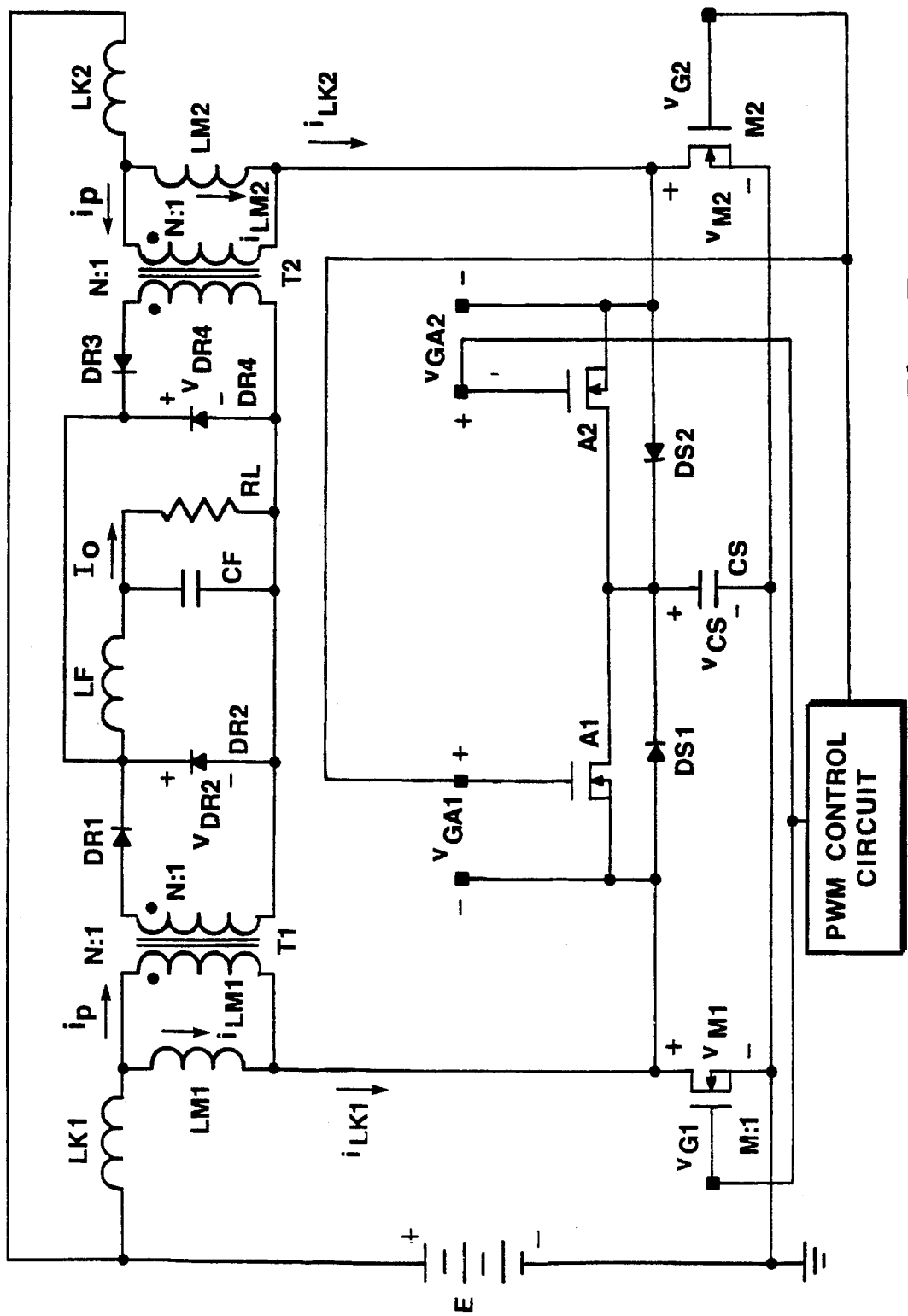
FIG. 5 is a schematic diagram of an embodiment of a low loss active voltage-clamp circuit for a single-ended, interleaved forward converter having a single clamping capacitor to balance duty cycles under asymmetrical operation, in accordance with the invention.

FIG. 5 is an illustration of a circuit embodiment having combined capacitors. In this embodiment, the magnetizing currents are forced to change to balance the duty cycles, thereby maintaining the proper voltage level in the capacitor CS. The flux balance of transformers T1 and T2 is maintained by the PWM control circuit, which senses the leakage currents $i_{LK1}$ and $i_{LK2}$, and the final output voltage on load RL, an in response to these sensed currents and voltages adjusts the duty cycle at the proper time.

In this embodiments of the invention, the clamping capacitor of the first active voltage clamp means for clamping and the clamping capacitor of the second active voltage clamp means for clamping are the same identical capacitor, so that the single clamping capacitor is connected to balance the duty cycle under asymmetrical operating conditions.

Figure 6:
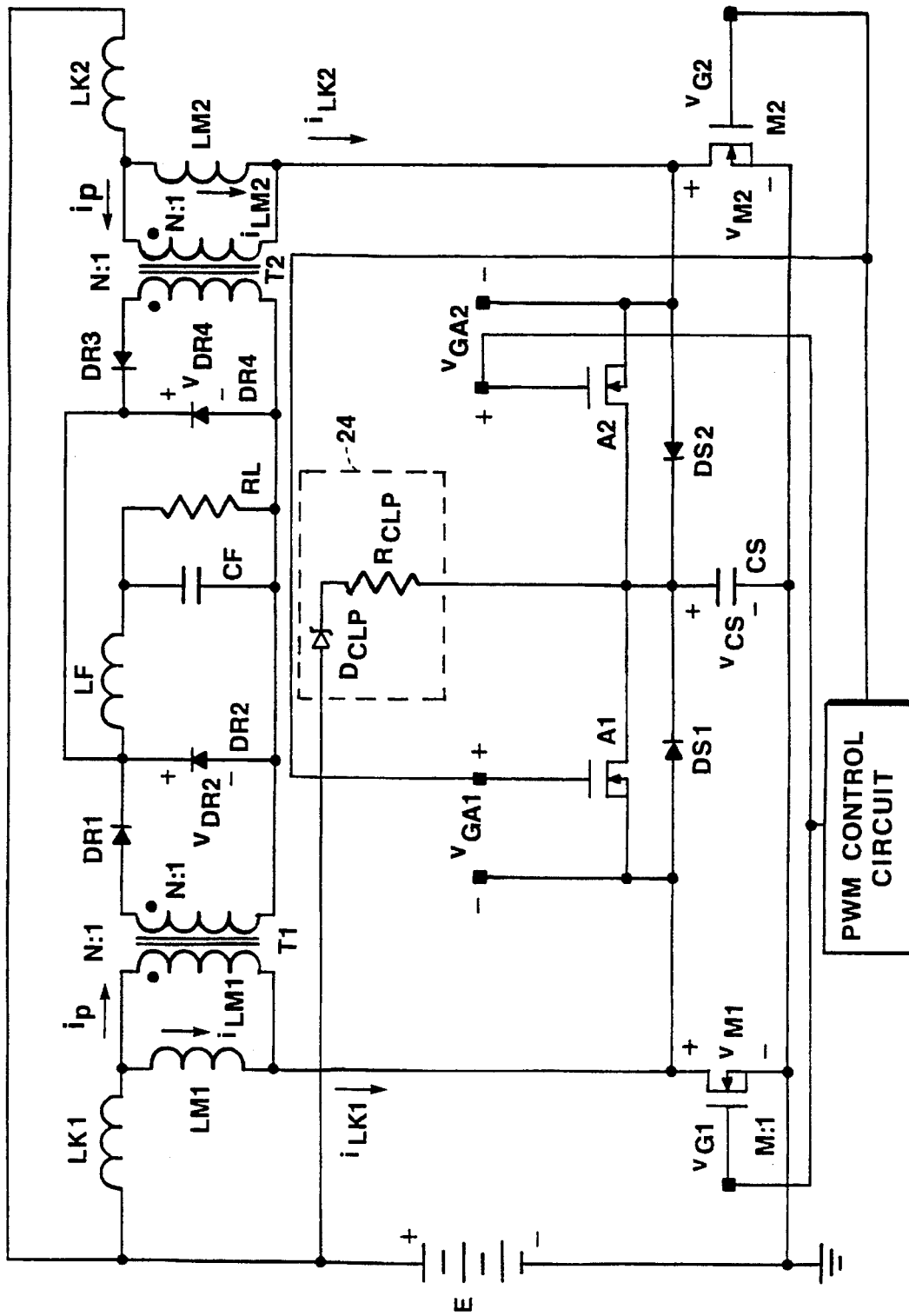
FIG. 6 is a schematic diagram of the circuit as in FIG. 5 including additional protection circuitry.

FIG. 6 is an illustration of an embodiment including a Zener clamp circuit 24, including zener diode DCLP and resistor RCLP, which prevents capacitor CS1 from charging too high during over-current conditions, which might occur when highly unbalanced duty cycles are generated from alternate clock cycles. Circuit 24 provides a current path to input 16 during the faulty conditions. In most cases, the PWM control will correct the pulse width asymmetry through a current limit loop.

This embodiment of the invention comprises overload protection circuitry connected between a high potential terminal of the voltage source and the highest potential terminal of the clamping capacitor, the protection circuitry comprising a Zener diode connected in series with a resistor.

Figure 7:
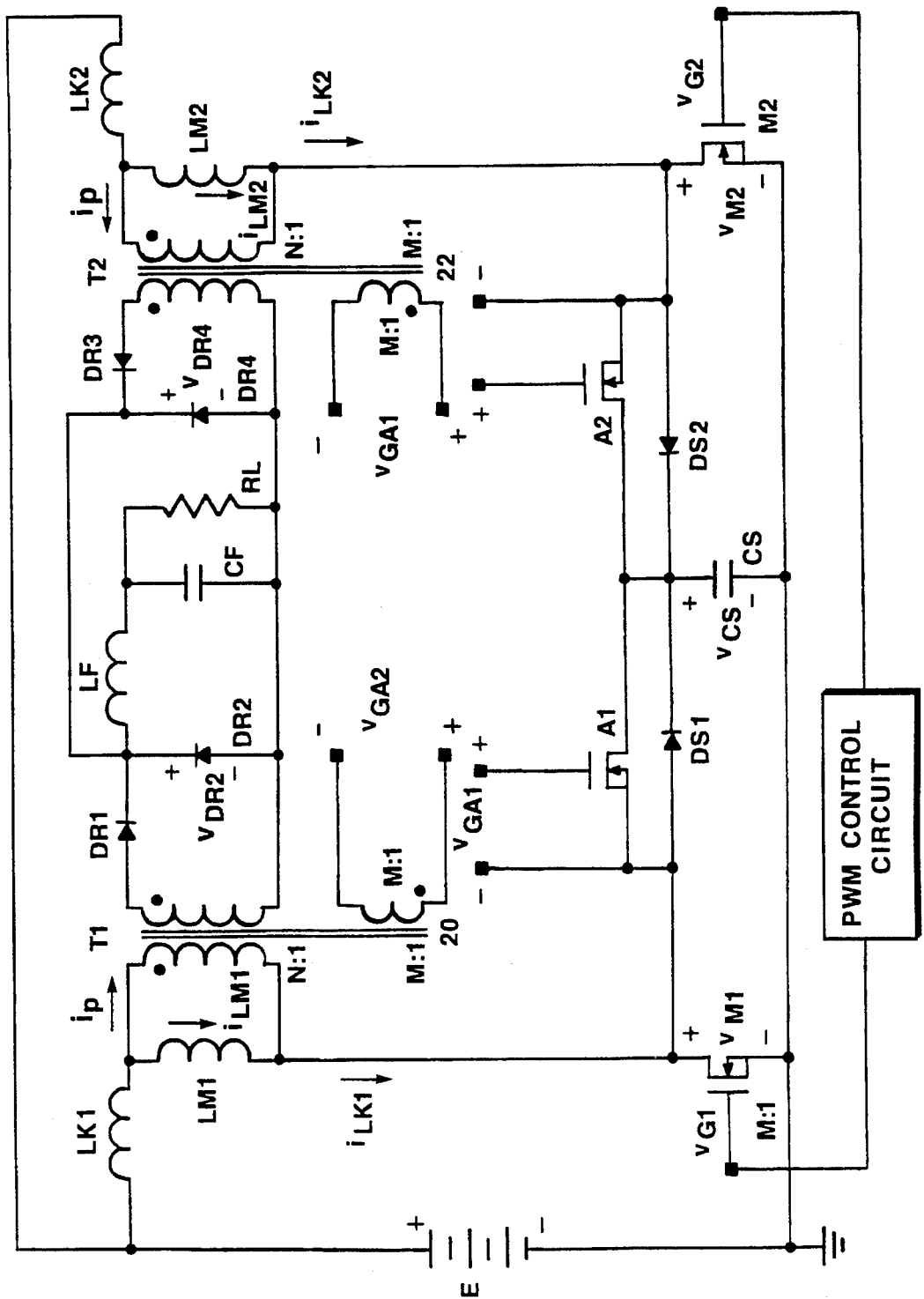
FIG. 7 is a schematic diagram of an embodiment of a low-loss active voltage-clamp circuit for a single-ended, interleaved forward converter having a single clamping capacitor to balance duty cycles under asymmetrical operation, and wherein the gate drive signals are derived from transformer tertiary windings, in accordance with the invention.

FIG. 7 shows a very cost-effective embodiment of the invention in an interleaved single-ended forward converter circuit. In such an embodiment the at least one other conductor of the first transformer means comprises a secondary conductor and a tertiary conductor; and the at least one other conductor of the second transformer means comprises a secondary conductor and a tertiary conductor. Also, the means for generating first and second auxiliary switch gating control signals comprises generating gating control signals having predetermined voltage characteristics from currents induced in the tertiary conductor of the first transformer means and the tertiary conductor of the second transformer means. The first auxiliary switch gating control signal being derived from the tertiary conductor in the second transformer means, the second auxiliary switch gating control signal being derived from the tertiary conductor in the first transformer means; and the means for generating first and second main switch gating control signals comprises a PWM control chip.

Figure 8:
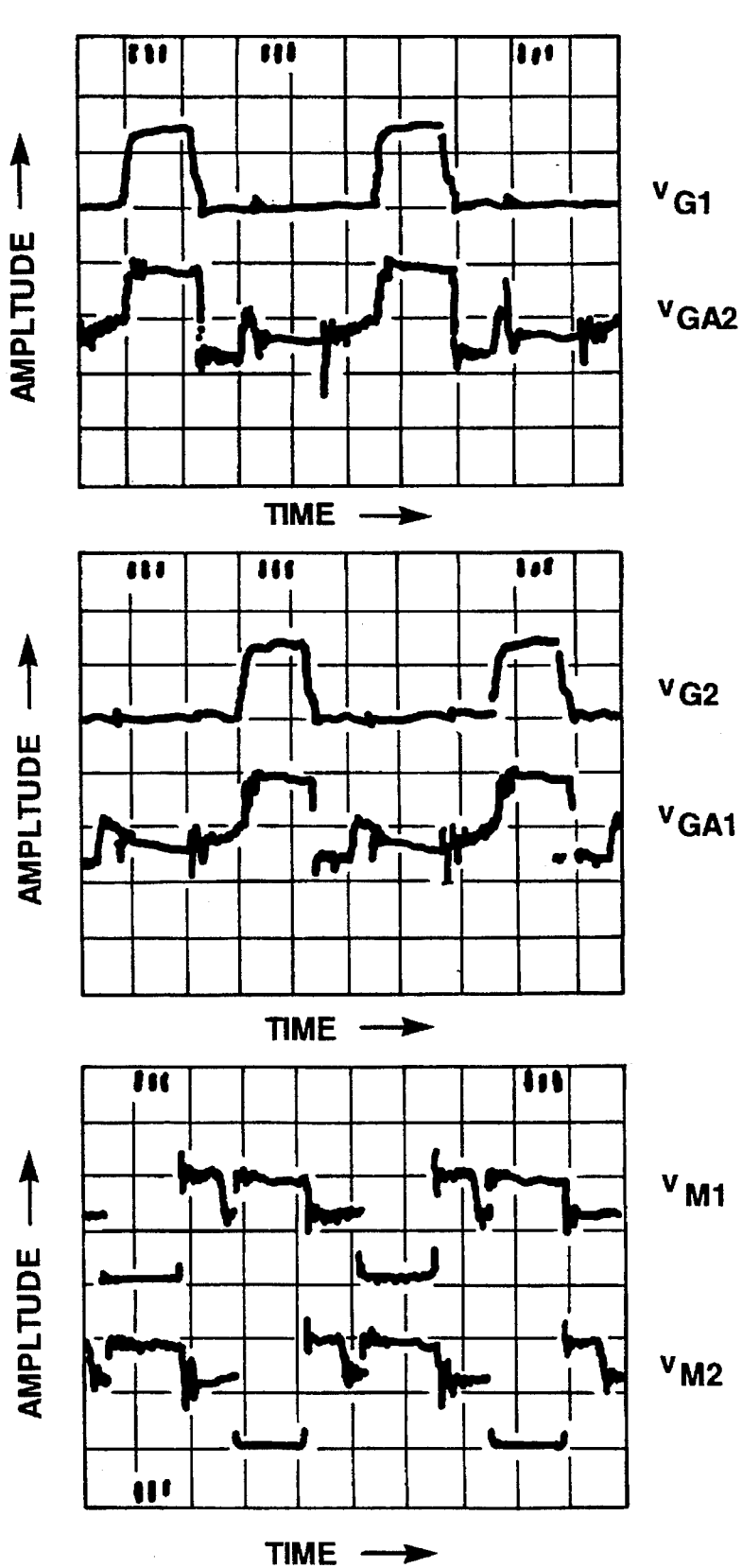
FIG. 8 is a waveform diagram for an implementation of a circuit corresponding to the circuit model illustrated in FIG. 7.

Gate drive signals $V_{GA1}$ and $V_{GA2}$ for auxiliary switches A1 and A2 are derived from transformers T2 and T1, respectively. FIG. 8 illustrates several waveforms associated with the circuit embodiment illustrated in FIG. 7. The embodiment of FIG. 7 requires only a third (tertiary) winding 20 and 22 from each of transformers T1 and T2, respectively, and does not need additional drivers for switches A1 and A2. Otherwise, PWM chips may not have sufficient driving capability and additional drivers external to the PWM chips may be needed.

Figure 9:
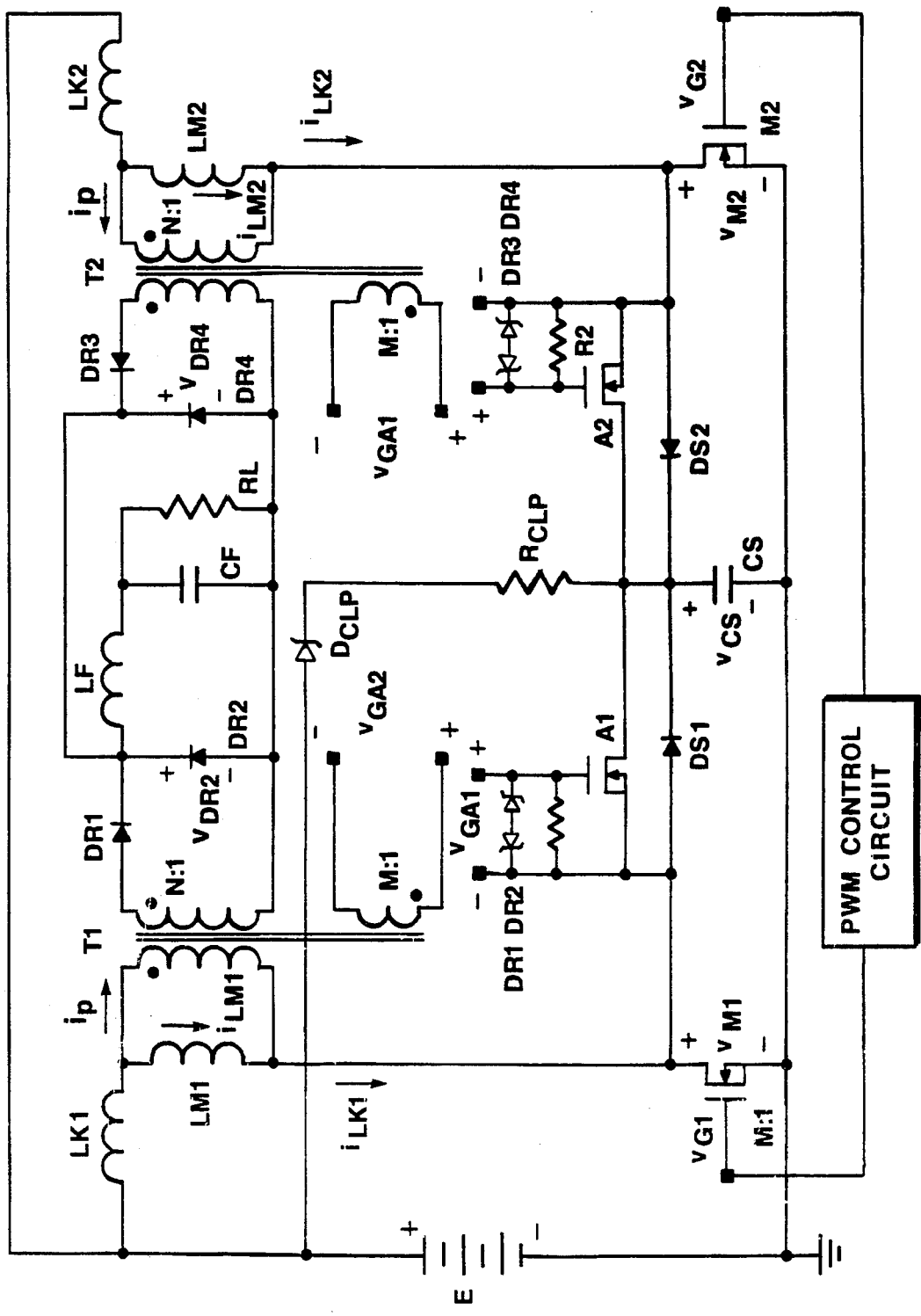
FIG. 9 is a schematic diagram of the circuit as in FIG. 7 including additional protection circuitry.

FIG. 9 is an illustration of an embodiment including a Zener clamp circuit including Zener diode DCLP and resistor RCLP, and a parallel combination of opposed Zener diodes DZ1 and DZ2 and a resistor RP1 connected between the gate and source of MOSFET A1, and a parallel combination of opposed Zener diodes DZ3 and DZ4 and a resistor RP2 connected between the gate and source of MOSFET A2. This protection circuity prevents capacitor CS from charging too high during over-current conditions and protects the MOSFETS, when highly unbalanced duty cycles are generated from alternate clock cycles. The circuit provides a current path to input during the faulty conditions. It also provides a current path during the floating condition. In most cases, the PWM control will correct the pulse width asymmetry through a current limit loop. In each embodiment, the inclusion of protection circuity is optional and may be provided by other circuit means.

The present active voltage clamp circuit clamps the peak voltage across the primary switch(es) of a single-ended interleaved forward converter to a minimum level, dissipating virtually no energy. In addition to satisfying the safety requirements for meeting CLASS 3 per IEC Publication 950, minimizing the peak turn-off voltages allows one to use lower voltage MOSFETs with lower on-resistance. As a result, conduction losses of the switches are reduced and the overall converter efficiency improved.

The low-loss active voltage clamp circuit, when used in a 5.1 volt, 150 ampere converter with input voltage range from 40 volts to 60 volts, improves the power conversion efficiency by 2.5%. The circuit also prevents the peak primary voltage from exceeding 140 volts.

It will be apparent to those skilled in the art that various changes in form and details of the invention as shown and described may be made. It is intended that such changes be included within the spirit and scope of the claims appended hereto.

U.S. patent application Ser. No. 08/027,031 filed Mar. 5, 1993, now patented to U.S. Pat. No. 5,351,179, is hereby incorporated by reference in its entirety.

What is claimed is:

1. A forward converter circuit comprising:
   a transformer having a primary side and a secondary side;
   rectifier means coupled to the secondary side of said transformer, for rectifying an induced secondary signal and generating a rectified signal;
   filter means coupled to said rectifying means, for filtering said rectified signal to remove signal frequencies causing undesired amplitude variation of said rectified signal;
   main current switch means, connected in series with the primary side of said transformer for switching main current on and off in response to a main switch gating control signal; and
   active voltage clamp means for clamping voltage across said main current switch means to a predetermined peak value in response to an auxiliary switch gating control signal.

2. The circuit as in claim 1, wherein said active voltage clamp means comprises:
   an auxiliary switching diode;
   an auxiliary switching transistor having a pair of terminals, each one coupled to a corresponding one of a pair of terminals of said diode, and further having a control terminal fed by said auxiliary switch gating control signal; and
   a clamping capacitor connected to one of the connections of said auxiliary switch and to said switching diode.

3. The circuit as in claim 2, wherein said active voltage clamp comprises:
   an auxiliary switching diode;
   an auxiliary switching transistor having a pair of terminals, each one coupled to a corresponding one of a pair of terminals of said diode, and further having a control terminal fed by said auxiliary switch gating control signal; and a clamping capacitor connected to one of the connections of said auxiliary switch and to said switching diode.

4. The circuit as in claim 3, wherein said clamping capacitor is connected between said diode and said primary side of said transformer.

5. The circuit as in claim 3 wherein said clamping capacitor is connected between said diode and a reference terminal.

6. The circuit as in claim 3 wherein said active voltage clamp further comprises means for generating a main switch gating control signal and an auxiliary switch gating control signal.

7. The circuit as in claim 1, wherein said means for generating, said transformer, said rectifier means, said filter means, and main current switch means, are correspondingly a first one of said recited elements and wherein said circuit further comprises:

a second transformer having a primary side and a secondary side;

second rectifier means coupled to the secondary side of said second transformer for rectifying an induced secondary signal and generating a second rectified signal;

second filter means coupled to said second rectifying means for filtering said second rectified signal to remove signal frequencies causing undesired amplitude variation of said second rectified signal;

second main current switch means, connected in series with the primary side of said second transformer for switching main current on and off in response to a second main switch gating control signal; and wherein said active voltage clamp means comprises:

means for clamping the voltage across said second main current switch means to a predetermined peak value in response to a second auxiliary switch gating control signal.

8. The circuit as in claim 7, wherein said active voltage clamp means comprises:

an auxiliary switching diode;

an auxiliary switching transistor having a pair of terminals, each one coupled to a corresponding one of a pair of terminals of said diode, and further having a control terminal coupled to said auxiliary switch gating control signal; and a clamping capacitor connected to one of the connections of said auxiliary switch and to said switching diode.

9. The circuit as in claim 8, wherein said clamping capacitor is connected between said diode and said primary side of said transformer.

10. The circuit as in claim 9, wherein said second main switch gating control signal is connected to said first auxiliary switch gating signal, and said first main switch gating control signal is connected to said second auxiliary switch gating signal.

11. The circuit as in claim 8, wherein said clamping capacitor is connected between said diode and a reference terminal.

12. The circuit as in claim 8, wherein said second main switch gating control signal is connected to said first auxiliary switch gating signal, and said first main switch gating control signal is connected to said second auxiliary switch gating signal.

13. The circuit as in claim 8, further comprising: an over voltage protection circuit comprising:

a resistor; and a Zener diode connected in series with said resistor and between the primary side of said transformer and said clamping capacitor.

14. The circuit of claim 7 wherein said active voltage clamp comprises at least one clamping capacitor;

an auxiliary switching diode;

an auxiliary switching transistor having a pair of terminals, each one coupled to a corresponding one of a pair of terminals of said diode at a pair of connectors, and further having a control element coupled to said auxiliary switch gating control signal;

said clamping capacitor connected to one of the connections of said auxiliary switch and to said switching diode.

15. The circuit of claim 4 wherein each of said first transformer means and said second transformer means further contain a second secondary side for generating a second voltage.

16. The circuit of claim 5 wherein each of said auxiliary switch means is controlled by said second secondary side transformer outputs from the opposite interleaved transformer side.

17. The circuit of claim 16 wherein said circuit further comprises:

an over voltage protection comprising:

a resistor;

a Zener diode connected in series with said resistor and being connected between the primary side of said transformer and said clamping capacitor.

* * * * *